United States Patent [19]

Agrawal et al.

[11] Patent Number: 5,300,374
[45] Date of Patent: Apr. 5, 1994

[54] ION CONDUCTING POLYMERS

[75] Inventors: Anoop Agrawal; Frederick R. Grimes; Pierre-Marc Allemand; Michael Trosky, Jr., all of Tucson, Ariz.

[73] Assignee: Donnelly Corporation, Holland, Mich.

[21] Appl. No.: 938,858

[22] Filed: Aug. 31, 1992

[51] Int. Cl.$^5$ .......................................... H01M 10/40
[52] U.S. Cl. ..................................... 429/192; 427/386
[58] Field of Search ...................... 429/192; 252/62.2; 427/386

[56] References Cited

U.S. PATENT DOCUMENTS

| | | | |
|---|---|---|---|
| 4,357,401 | 11/1982 | Andre et al. | 429/192 |
| 4,758,483 | 7/1988 | Armand et al. | 429/192 |
| 4,792,504 | 12/1988 | Schwab et al. | 429/192 |
| 4,840,856 | 6/1989 | Nakacho et al. | 429/192 |
| 5,051,211 | 9/1991 | Ward et al. | 429/192 |
| 5,061,581 | 10/1991 | Narang et al. | 429/192 |
| 5,173,205 | 12/1992 | Marchese et al. | 429/192 X |
| 5,194,490 | 3/1993 | Suga et al. | 429/192 X |

FOREIGN PATENT DOCUMENTS 2-34660 of 1990 Japan.

OTHER PUBLICATIONS

M. Gauthier, M. Armand, D. Muller in *Electroresponsive Molecular and Polymer Systems*, 1988, Chapter 2.
F. M. Gray, *Solid Polymer Electrolytes*, 1991, Chapter 6.

*Primary Examiner*—Stephen Kalafut
*Attorney, Agent, or Firm*—Price, Heneveld, Cooper, DeWitt & Litton

[57] ABSTRACT

An ion conducting polymer composition is described which exhibits electrical conductivities of at least $10^{-6}$ S/cm and has good optical properties and is easily processable. The composition comprises a PEO-based block copolymer and a dissociable lithium salt. The invention also includes a laminate formed from the ion conducting polymer composition, and related methods of forming.

24 Claims, 1 Drawing Sheet

ION CONDUCTING POLYMERS

BACKGROUND OF THE INVENTION

The present invention relates to an electrically conductive polymer composition formed from a solid solution of a dissociable salt in a polymer. Electrically conductive polymers of this type, herein referred to as ion conducting polymers are employed in numerous applications such as energy storage, sensors, selective membranes, antistatic films, and electrochromic devices. Typically, such applications dictate that the conducting polymer composition exhibit a conductivity of at least $10^{-6}$ S/cm (Siemens per centimeter) at room temperature (25° C.). When applied in electrochromic devices, such polymer systems must also have good optical properties and be easily processable, particularly for lamination operations.

Ion conducting polymer compositions at a minimum comprise one or more polymers and an effective amount of at least one dissociable salt dissolved therein. The conductivity of the resulting composition appears to result from the presence of the solvated salt, while the polymer provides a stable network for maintaining solvation of the salt. Thus, the conductivity of the composition depends upon the solvation capacity of the polymer, temperature, amount of salt dissolved therein, and form of the network structure.

The reason for differences in solvation capacities between polymers stems from the multidentate nature of intramolecular solvation and the tendency for some unhindered, long chain molecules having donor electrons to adopt a cage configuration in which the donor electrons are cation. This solvation mechanism is well known for crown ethers in which cages of predetermined size are employed to specifically solvate cations of corresponding radius. The prior art has recognized that a polyethylene oxide (PEO) based ion conducting polymer composition appears to offer the best combination of a high density of donor heteroatoms (i.e. the oxygen atom of PEO) and a sufficiently long linear hydrocarbon chain segment In most ion conducting polymer compositions, in order to achieve relatively high conductivities (i.e. $10^{-6}$ S/cm) the polymer must be in an amorphous state to sufficiently solvate the salt. Thus, it is necessary to suppress the crystallization of the PEO-based polymer such that the polymer is in an amorphous state at room temperature. One method of obtaining an amorphous polymer composition at room temperatures is to utilize a short chain, low molecular weight polymer. However, such short chain polymers do not sufficiently possess mechanical integrity (may even be a paste or a liquid) at room temperature. Therefore, other means must be utilized to suppress the crystallization of the PEO-based polymer while retaining relatively long chain segments in the polymer.

There are other methods which are available to suppress the crystallization of a polymer. These include disrupting the polymer chain to minimize its tendency to crystallize. This may be done by introducing comonomers, adding side chains, utilizing a random or block copolymer or cross-linking of the polymer. Plasticizers may also be added to the polymeric composition to modify the polymer's $T_g$. Although the use of ion conducting polymers in electrochemical devices has been recognized by the prior art, and the application of such polymers to electrochromic devices has been envisaged, this approach represents a unique method to achieve an ion conducting polymer composition having a conductivity of at least $10^{-6}$ S/cm in conjunction with high optical quality and processing characteristics to enable use of the composition in electrochromic devices.

SUMMARY OF THE INVENTION

The present invention is a lithium conducting polymer composition which exhibits excellent conductivity and has attractive processing characteristics and good optical properties. The composition comprises an effective amount of a dissociable lithium salt solvated by a polymeric network which is made of a block copolymer having a molecular weight less than about 5000. The block copolymer for use in the present invention has the formula; $R'(CH_2CH_2O)_n-R''$ where n is from about 34 to about 5; and $R'$ and $R''$ are appropriate flexible units. The present invention also includes a laminate formed from the ion conducting polymer composition, and a related method of forming the laminate.

DESCRIPTION OF THE PREFERRED EMBODIMENT

Figure 1:
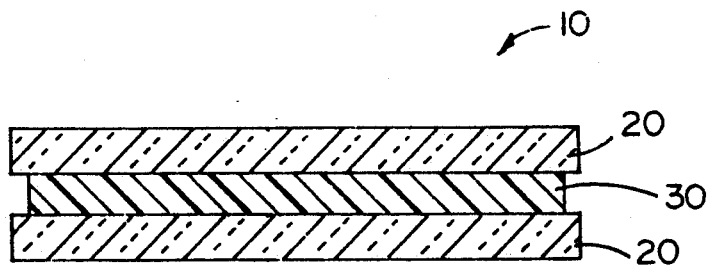
FIG. 1 is a cross section of an ion conducting polymeric laminate of the present invention.

The present invention for an electrically conducting polymer composition comprises a PEO-based block copolymer and a dissociable lithium salt. When combined, a solid solution is formed whereby the salt dissociates and is solvated by the polymer. Since solvation occurs by the PEO chain generally forming a cage-like structure around dissociated lithium cations, it is important that the ends of the PEO chain are not restrained by the polymer network, which would otherwise reduce the chain's flexibility and cage formation ability. Therefore, a block copolymer is utilized having a central block of PEO and terminal end groups formed from other molecular units such as polypropylene oxide (PPO) which reactively tie into the network yet allow the PEO chain to retain its flexibility.

The block copolymer of the present invention comprises a central block of ethylene oxide (EO) and two terminal end groups $R'$ and $R''$. The copolymer has the following formula:

$$R'-(CH_2CH_2O)_n-R''$$

such that end groups $R'$ and $R''$ are both or individually any flexible unit suitable for a PEO-based polymeric network; n is from about 34 to about 5; and the total molecular weight of the block copolymer is less than about 5000.

The use of from about 34 to about 5 units of ethylene oxide corresponds to a total molecular weight of the resulting PEO chain of from about 1500 to about 200. If a greater number of repeating EO units are utilized in forming the PEO chain, the resulting polymer is found to have a tendency to crystallize at room temperatures resulting in poor conductivity and optical properties. If a lesser number of repeating EO units are used, the PEO block copolymer is too short to encompass the dissociated lithium cation thus resulting in poor conductivity.

The average molecular weight of the above described block copolymer is less than about 5000. Block copolymers having molecular weights greater than 5000 result in undesirable processing characteristics of the resulting system. It is preferred to utilize the above block copolymer $R'—(CH_2CH_2O)_n—R''$, having an average molecular weight of less than about 2500.

The molecular weight of end groups $R'$ and $R''$ in the block copolymer depend upon the specific application of the ion conducting polymer composition. However, the total molecular weight of the end groups $R'$ and $R''$, is such that the total molecular weight of the block copolymer is less than about 5000. End groups $R'$ and $R''$ are both or individually any flexible unit suitable for a PEO-based polymeric network. Examples of such flexible units for end groups $R'$ and $R''$ include polypropylene oxide (PPO), polyethyleneimine, polyphosphazine, or polysiloxane. "Polysiloxane" as used herein encompasses substituted polysiloxanes. It is preferred to utilize PPO for both $R'$ and $R''$ end groups. When utilizing PPO for either or both end groups $R'$ and $R''$, it is most preferred to use branched propylene oxide (PO) rather than linear PO in forming PPO. PPO end groups also enable the practitioner to easily cross-link the resulting polymers by techniques known in the art.

The salt employed in the present invention may be any dissociable lithium salt such as $LiPF_6$, $LiBF_4$, LiBr, $LiN(SO_2CF_3)_2$, LiI, $LiNO_3$, LiSCN, $LiB(C_6H_5)_4$, $LiAsF_6$, $LiCF_3COO$, $LiClO_4$, $LiCF_3SO_3$, $LiSO_3(CF_2)_3SO_3Li$ or $Li_2S$. The preferred salt is $LiCF_3SO_3$. Dissociable salts may be employed which utilize a cation other than lithium, such as sodium. The amount of dissociable lithium salt added to the block copolymer in forming the ion conducting polymer composition depends upon the final ratio of units of EO in the block copolymer to lithium cations. It has been discovered by the present inventors that the optimal combination of conductivities of at least $10^{-6}$ S/cm, processing characteristics, and optical properties result when a ratio of from about 6 to about 80 moles of EO to 1 mole of lithium cation is employed. The preferred molar ratio is from about 6:1 to about 20:1 of moles of EO to moles of lithium cations.

The viscosity and flow characteristics of the initial liquid form of the ion conducting polymer composition may be tailored to obtain the desired processing characteristics, conductivity, mechanical properties, and adhesion characteristics of the uncured and/or cured composition. The preferred viscosity of the uncured polymer composition is less than about 100 Poise and most preferably less than about 10 poise, at room temperature. When the ion conducting polymer composition of the present invention is used in applications necessitating transparency or semitransparency, the ion conducting polymer composition should have at least about 70% luminous transmittance with no observable haze.

The luminous transmittance as discussed herein refers to the percentage of light transmittance, based upon the light source, which passes through a cell laminate. The cell is formed from the following layers; glass, ITO (indium tin oxide), the composition of the present invention, ITO, and glass. The light source was a standard distribution of light wavelengths referred to as illuminant A in the industry and a detector referred to as 1931 2° CIE Standard Observer.

One method of altering one or more of the above mentioned characteristics or properties is to incorporate a plasticizer that assists in the dissociation of the salt and which is also compatible with the cured polymeric matrix. The addition of such a plasticizer contributes in lowering the viscosity of the initial liquid form of the polymer and enhances conductivity and softness of the cured ion conducting polymer composition. The amount of plasticizer added will depend upon the particular application, however such amounts may be readily determined by skilled practitioners.

The plasticizer must be compatible with the polymer so that migration or phase separation of the plasticizer from the polymer matrix does not occur. Incompatibility between plasticizer and matrix results in poor optical qualities and/or a decrease in conductivity. The compatibility of the plasticizer depends on its molecular weight and on its chemical nature, as compared to the matrix. The compatibility of the plasticizer may be measured by the swelling of the cured matrix when it is immersed in a given plasticizer as illustrated in Example 3.

Typical plasticizers which may be utilized in the present invention include propylene carbonate, ethylene glycol, glycerol, tetraethylene glycol, polyethylene glycol, propylene triol (Voranol 230-238 available from Dow Chemical Co., of Midland, Mich.), and propylene-/ethylene triol (Voranol 235-056). Although the intended application and desired processing characteristics greatly influence the selection of plasticizer, the preferred plasticizer for use wita PPO-PEO-PPO block copolymer is propylene carbonate.

Another method of modifying the processing characteristics and the polymer network properties is to incorporate particular materials in the network to form dangling branches. Dangling branches are formed by reacting agents having only one reactive end group with the polymer chain. The agents are then retained by the polymer network at only one of their ends. It is believed that the dangling branches primarily attach to one or both ends $R'$ and $R''$ of the block copolymer, as opposed to attaching along the PEO chain. Formation of dangling branches reduces the degree of cross-linking of the polymer network, thus suppressing its rigidity. Formation of dangling branches may also affect the viscosity of the uncured ion conducting polymer and stiffness or hardness of the cured polymer. Moreover, since the unanchored end of a dangling branch is free to move, enhanced conductivities and solvating capacities typically result. This effect is more pronounced if the polymer chain is made out of a Lewis base (electron pair donor) such as PEO, polyethyleneimine, etc.

Dangling branches may be formed in numerous fashions. Preferred dangling branches for use with the present invention have the formula:

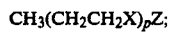

where p is from about 0 to about 10; X is a heteroatom such as oxygen, nitrogen, or sulfur; and Z is an organic reactive functional group. Examples of such Z groups include epoxy, glycidoxy, amino, mercapto, hydroxyl and acrylate. A specific example of forming dangling branches is by the addition of butyl glycidyl ether or 3-glycidoxy triethylene glycol monomethyl ether to a PEO-based polymer.

Silane coupling agents may be employed to increase the adhesion of the ion conducting polymer to substrates and electrodes (e.g. inorganic oxides and metals). Increased adhesion from adding silane coupling agents is due to one end of the agent reacting with the polymer network and the other end reacting with or attaching to the substrate or electrode.

One manner of incorporating silane coupling agents at the interface of the polymer network and substrate is by coating the surface of the substrate with the silane coupling agent such that the organic end of the silane may react with the ion conducting polymer during processing. If good adhesion can be obtained in this manner, it is preferred to merely add the silane coupling agent to the ion conducting polymer as opposed to priming the substrate with the agent. In this manner, an additional processing step of priming the substrate is eliminated.

A variety of silane coupling agents may be used with the present invention. The preferred silane coupling agents have the following formula:

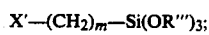

$$X'-(CH_2)_m-Si(OR''')_3;$$

where m is from about 2 to about 6; $X'$ is a reactive organic group; and $R'''$ is an alkyl group of from about 1 carbon to about 2 carbons. Examples of such $X'$ groups include glycidoxy, amino, mercapto, hydroxy and acrylate. Specific examples of preferred silane coupling agents include; 3-glycidoxy propyl trimethoxy silane, 3-aminopropyl triethoxy silane, 3-(2-aminoethylamino) propyl trimethoxy silane, 3-chloropropyl trimethoxy silane, octadecyl trimethoxy silane, 3-mercaptopropyl trimethoxy silane, and 3-trimethoxysilylpropyl methacrylate. Of course, the requirements of the particular application dictate the choice and amount of coupling agent. One can further combine all the methods of modification described herein to further control the properties of the polymer composition either before, during, or after processing and/or curing.

Figure 2:
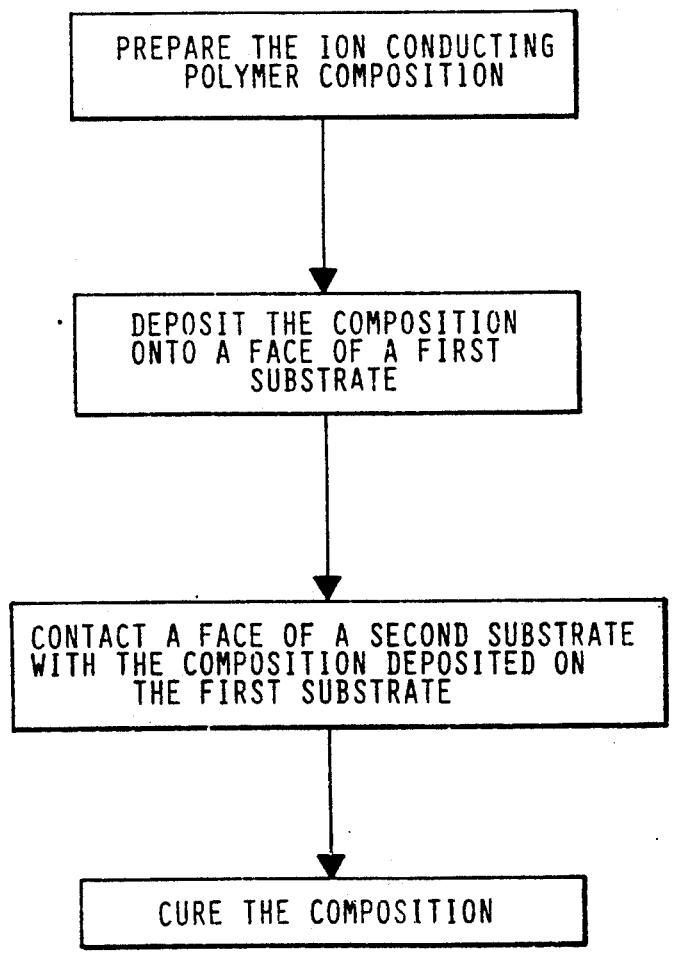
FIG. 2 is a block diagram illustrating the sequence of steps in forming the ion conducting polymeric laminate of the present invention.

The present invention also concerns the formation of a laminate of the ion conducting polymer composition as illustrated in FIGS. 1 and 2. Referring to FIG. 1, a laminate 10 is formed of the ion conducting polymer composition 30 as described herein between two substrates 20. Substrate 20 may be formed from a variety of materials. Note that substrate 20 may be coated on its inwardly facing surface with thin film coatings to provide functional property to the laminate assembly such as of an electrical, electro-optical, optical or equivalent nature. For example, one of the inwardly facing surfaces of substrate 20 can be coated with a thin film of indium tin oxide transparent conductor followed by a thin film of a cathodic electrochromic material such as tungsten oxide, and the other inwardly facing surface of substrate 20 can be coated with an indium tin oxide transparent conductor thin film followed by a thin film of an anodic electrochromic such as nickel oxide, vanadium oxide or polyaniline. The ion conducting polymer composition 30 as described herein would form the electrolyte in such an electrochromic device. The method of forming laminate 10 is illustrated in FIG. 2 and may be practiced in primarily two ways. One method comprises pouring the polymer composition in a liquid form, onto one of the substrates, then lowering the second substrate onto the first such that a thin film of the liquid is trapped between the two substrates. The polymer composition is cured by heating the assembly to an appropriate cure temperature less than 250° C. and preferably less than 150° C. The polymer composition may also be cured by exposure to radiation or by a combination of radiation and thermal means.

A second method of forming a laminate of the ion conducting polymer comprises partially curing a thin film of the polymer composition, which may then be used to laminate the two substrates together using techniques such as hot pressing, vacuum bagging, autoclaving, or combinations thereof. The partially cured polymer composition may then be fully cured during these processing techniques, or by techniques described in the first method.

As described herein, the mechanical properties of the polymer composition may be tailored depending upon the particular application of the composition. Therefore, by designing tough, resilient polymer compositions which strongly adhere to one or more substrates, a shatterproof feature may be obtained for applications which utilize glass or other brittle substrates. Note that ultraviolet radiation absorbers and stabilizers such as benzotriazoles, benzophenones, hindered amines, and the like, can be incorporated into the ion conducting polymer composition to enhance weathering resilience. Also, spacers such as glass spheres, polymer spheres, glass frit and the like can be incorporated into compositions 30 to establish a desired thickness for the ion conducting composition. Also, antimicrobial agents such as isothiazolones, organosulfur compounds and mercaptans can be added along with antioxidants such as phenolic antioxidants, amine antioxidants and alkyl, aryl or mixed alkylaryl phosphites. Also, colored materials such as dyes and pigments can be added to achieve any desired color in the polymer composition 30. Preferably, such materials are selected to be UV stable and to be physically, chemically, and electrochemically compatible with the system.

Examples 1-2 and 5 illustrate the conductivity of an ion conducting polymer composition comprising a lithium salt and a PPO-PEO-PPO block copolymer. Examples 1 and 2 employ various amounts of LiClO$_4$ and Example 5 utilizes LiCF$_3$SO$_3$. Example 3 indicates various plasticizers and their relative compatibility with a PPO-PEO-PPO block copolymer. Example 4 illustrates the effect upon conductivity of varying the amount of plasticizer utilized in the composition. Examples 6 and 12 further illustrate the effects of the addition of plasticizers. Examples 7-9 illustrate the use of dangling branches in the present invention. Examples 10-11 illustrate the effect of varying the ratio of lithium salt to the number of units of ethylene oxide in the block copolymer. Example 13 illustrates the use of silane coupling agents in the present invention. Luminous transmittance measurements were made for samples in Examples 4, 7 and 13(b).

EXAMPLE 1

A network was formed from a polyetherdiamine with a polyethylene oxide block of 15 to 16 units and a molecular weight of 900 g/mole, and a diepoxide having an average molecular weight of 380 g/mole, formed mainly from propylene oxide. 10.65 g of the diamine and 0.25 g of LiClO$_4$ were added together, continuously stirred, and heated in an inert atmosphere to 100° C. for four hours. The resulting ratio of moles of ethylene oxide to moles of lithium cations was about 78:1. After the solution cooled, 8.3 g of the diepoxide was added and thoroughly mixed. All preparation was carried out in an inert atmosphere. A thin layer of the resulting resin was applied between two conductive plates, followed by curing for one hour at 115° C. The ionic conductivity of the sample at room temperature was measured to be $1.2 \times 10^{-6}$ S/cm.

EXAMPLE 2

Another sample was produced using the same ingredients as in Example 1, but with a higher salt concentration. The amounts of the diamine, salt, and diepoxide added were 24.7 g, 2.74 g, and 19.3 g respectively. The resulting ratio of moles of ethylene oxide to moles of lithium cations was about 16.5:1. The ionic conductivity of this sample at 40° C. was $2 \times 10^{-5}$ S/cm. A sample formed from 25 g of diepoxide, 16.5 g of diamine and 3 g of $LiClO_4$ had a conductivity of $2 \times 10^{-6}$ S/cm at room temperature.

EXAMPLE 3

26.3 g of the above-described diamine was mixed with 20.5 g of the diepoxide. A sheet of the resulting resin was cast and cured at 115° C. for one hour. A 1 inch by 1 inch sample was immersed in propylene carbonate for 20 hours. The cured resin swelled and showed a weight increase of 240%. In the same period, other samples were immersed in polyethylene glycol having a molecular weight of 600 g/mole, polypropylene triol having a molecular weight of 700 g/mole, and a diethylene oxide/propylene oxide glycol having a molecular weight of 3800 g/mole. Each sample showed a weight increase after a period of 24 hours of 18.9%, 6.4% and 5.4% respectively.

EXAMPLE 4

12 g of the diamine, 1 g of $LiClO_4$ and 9.4 g of the diepoxide were mixed as above. The resulting ratio of moles of ethylene oxide to moles of lithium cations was about 22:1. Before curing, two samples were formed. 0.55 g of propylene carbonate was added to the first sample, and 1.65 g of propylene carbonate was added to the second sample. After curing both samples at 115° C. for one hour, the first sample exhibited an ionic conductivity of $4 \times 10^{-6}$ S/cm and the second sample, $1 \times 10^{-5}$ S/cm. The luminous transmittance of both samples was 81.39% with no haze.

EXAMPLE 5

A mixture of 2 g (2.22 mmol) of the diamine (from Example 1) and 0.27 g (1.71 mmol) of lithium trimethylsulfonate, $LiCF_3SO_3$ was placed in a round bottom flask, in an inert atmosphere with constant stirring at 50° C. The resulting ratio of moles of ethylene oxide to moles of lithium cations was about 20:1. A transparent solution with no residue was obtained after four hours. 1.69 g (4.46 mmol) of diepoxide (from Example 1) was added to 2.27 g of the above solution. After mixing for one hour, the viscosity of the resulting resin was 4.2 Poise at 25° C. A thin layer of this resin was formed between two indium tin oxide (ITO) conducting glass plates and the sample subsequently cured at 115° C. for one hour. All ingredients used were stored in vacuum at 68° C. for at least eight hours before use, and all processing including curing was performed in an inert atmosphere. The conductivity of this sample was $2 \times 10^{-6}$ S/cm.

EXAMPLE 6

Same as Example 5, but the following plasticizers were added in amounts corresponding to 10% by weight of the diepoxide, and mixed before curing:

(a) Polyethylene glycol having a molecular weight of 600 g/mole. The conductivity of this sample was $4.0 \times 10^{-6}$ S/cm.

(b) Propylene triol having a molecular weight of 700 g/mole (Voranol 230-238 from Dow Chemical Co., of Midland, Mich.). The conductivity of this sample was $2.7 \times 10^{-6}$ S/cm.

(c) Propylene/ethylene triol having a molecular weight of 3000 g/mole (Voranol 235-056 from Dow Chemical Co.). The conductivity of this sample was $2.5 \times 10^{-6}$ S/cm.

(d) Propylene carbonate having a molecular weight of 102 g/mole. The conductivity of this sample was $5.2 \times 10^{-6}$ S/cm.

EXAMPLE 7

A mixture of 2 g (2.22 mmol) of the diamine (from Example 1) and 0.27 g (1.71 mmol) of $LiCF_3SO_3$ was heated in an inert atmosphere with constant stirring at 50° C. To this mixture, one equivalent or 0.31 g (2.22 mmol), of butyl glycidyl ether (BGE) (to give dangling branches and reduce the degree of cross-linking) and 1.27 g (3.34 mmol) of diepoxide were added. The viscosity of the resulting sample at 22° C. was 5.7 Poise. After mixing and degassing, the sample was cured at 115° C. for three hours. The conductivity of this sample was $6.2 \times 10^{-6}$ S/cm. A laminate was produced by sandwiching a 0.1 mm thick layer of this material between two pieces of ITO coated glass. The luminous transmittance through this cell was 80.11% with no haze.

EXAMPLE 8

Same as Example 7, but 0.62 g (4.43 mmol) of BGE was added. The conductivity of this sample was $7.3 \times 10^{-6}$ S/cm. Due to the low degree of cross-linking, the sample was semisolid.

EXAMPLE 9

A mixture of the diamine from Example 1 (2 g, 2.22 mmol) and $LiCF_3SO_3$ (0.27 g, 1.71 mmol) was heated in an inert atmosphere with constant stirring at 50° C. To the above solution a mixture of 0.48 g (2.22 mmol) of 3-glycidoxy triethylene glycol monomethyl ether (to give dangling branches of ethylene oxide) and 1.27 g (3.33 mmol) of diepoxide was added. After stirring and degassing, the solution was cast into films between ITO glass using 100 micron glass beads as spacers. These samples were then cured at 115° C. for three hours under nitrogen. The conductivity was $4.5 \times 10^{-6}$ S/cm.

EXAMPLE 10

Same as Example 7, but 0.68 g (4.27 mmol) of $LiCF_3SO_3$ was added to 2.0 g (2.22 mmol) of the diamine resulting in a ratio of ethylene oxide units to lithium cations of 8:1. The conductivity of this sample was $4.0 \times 10^{-6}$ S/cm.

EXAMPLE 11

Same as Example 7, but 0.14 g (0.854 mmol) of $LiCF_3SO_3$ was added to 2.00 g (2.22 mmol) of the diamine resulting in a ratio of ethylene oxide units to lithium cations of 40:1. The conductivity of this sample was $2.22 \times 10^{-6}$ S/cm.

EXAMPLE 12

Similar to Example 7, but 10% propylene carbonate by weight of epoxy was added as in Example 6. The conductivity of this sample was $5.9 \times 10^{-6}$ S/cm.

EXAMPLE 13

A mixture of 2 g (2.22 mmol) of the diamine (from Example 1) and 0.27 g (1.71 mmol) of LiCF$_3$SO$_3$ was heated in an inert atmosphere with constant stirring at 50° C.

(a) To 1.14 g of the above solution, a mixture of 0.26 g (1.11 mmol) of 3-glycidoxy propyl trimethoxy silane (coupling agent), and 0.63 g (2.26 mmol) of diepoxide (from Example 1) was added. After stirring and degassing, the sample was cured at 115° C. for one hour. The conductivity of this sample was $3.9 \times 10^{-6}$ S/cm.

(b) To 1.135 g of the above solution, a mixture of 0.026 g (0.10 mmol) of 3-glycidoxy propyl trimethoxy silane (coupling agent), 0.14 g (1.00 mmol) of BGE and 0.63 g (2.26 mmol) of diepoxide (from Example 1) was added. After stirring and degassing, the sample was cured at 115° C. for three hours. The conductivity of this sample was $4.5 \times 10^{-6}$ S/cm, and the luminous transmittance was 81.39% with no haze.

Of course, it is understood that the foregoing merely notes preferred embodiments of the invention and that various changes and alterations can be made without departing from the spirit and broader aspects thereof as set forth in the appended claims, which are to be interpreted in accordance with the principles of patent law, including the doctrine of equivalents.

The embodiments of the invention in which an exclusive property or privilege is claimed are defined as follows:

1. An ion conducting polymer composition comprising:
   a block copolymer of the formula R'—(CH$_2$CH$_2$O)$_n$—R", wherein the molecular weight of said block copolymer is less than about 5000, n is from about 5 to about 34, and R' and R" are flexible units; and
   an effective amount of a dissociable lithium salt.

2. An ion conducting polymer composition in accordance with claim 1 wherein said dissociable lithium salt is selected from the group comprising LiPF$_6$, LiBF$_4$, LiBr, LiN(SO$_2$CF$_3$)$_2$, LiI, LiNO$_3$, LiSCN, LiB(C$_6$H$_5$)$_4$, LiAsF$_6$, LiCF$_3$COO, LiClO$_4$, LiCF$_3$SO$_3$, LiSO$_3$(CF$_2$)$_3$SO$_3$Li, and Li$_2$S.

3. An ion polymer composition in accordance with claim 2 wherein said R' and said R" are both polypropylene oxide.

4. An ion conducting polymer composition in accordance with claim 3 wherein the molar ratio of ethylene oxide in said block copolymer to lithium cation is from about 6:1 to about 80:1.

5. An ion conducting polymer composition in accordance with claim 1 further comprising:
   a compatible plasticizer.

6. An ion conducting polymer composition in accordance with claim 5, wherein said plasticizer is selected from the group comprising propylene carbonate, ethylene glycol, glycerol, tetraethylene glycol, polyethylene glycol, propylene triol and propylene/ethylene triol.

7. An ion conducting polymer composition in accordance with claim 1 further comprising:
   a silane coupling agent.

8. An ion conducting polymer composition in accordance with claim 7 wherein said silane coupling agent is of the formula X'—(CH$_2$)$_m$—Si(OR''')$_3$; m is from about 2 to about 6; X' is selected from the group comprising glycidoxy, amino, mercapto, hydroxyl and acrylate; and R''' is selected from the group comprising —CH$_3$ and —CH$_2$CH$_3$.

9. An ion conducting polymer composition in accordance with claim 1 wherein said end groups R' and R" are selected from the group comprising polypropylene oxide, polyethyleneimine, polyphosphazine, and polysiloxane.

10. An ion conducting polymer composition in accordance with claim 1 wherein the ratio of the number of moles of ethylene oxide in said block copolymer to the number of moles of lithium cations in said dissociable lithium salt is from about 6:1 to about 80:1.

11. An ion conducting polymer composition in accordance with claim 10 wherein the molar ratio of ethylene oxide in said block copolymer to lithium cation is from about 6:1 to about 20:1.

12. An ion conducting polymer composition in accordance with claim 1 wherein said block copolymer has a molecular weight less than about 2500.

13. An ion conducting polymer composition in accordance with claim 1 further comprising:
   dangling branches primarily attached to at least one of said R' and R" groups, said dangling branches of the formula CH$_3$(CH$_2$CH$_2$X)$_p$Z; wherein p is from about 0 to about 10; X is selected from the group comprising oxygen, nitrogen, and sulfur; and Z is selected from the group comprising epoxy, glycidoxy, amino, mercapto, hydroxyl, and acrylate.

14. A method of forming an ion conducting polymeric laminate between a first and a second substrate, each said substrate having two faces, said method comprising:
   preparing an ion conducting polymer composition comprising a block copolymer and an effective amount of a dissociable lithium salt, said block copolymer being of the formula R'—(CH$_2$CH$_2$O)$_n$—R", wherein the molecular weight of said block copolymer is less than about 5000, n is from about 5 to about 34, and R' and R" are flexible units;
   depositing said composition onto one of said faces of said first substrate;
   contacting one of said faces of said second substrate with said composition deposited upon said first substrate such that a thin film of said composition is formed between said first and said second substrates; and
   curing said composition.

15. A method of forming an ion conducting polymeric laminate in accordance with claim 14 wherein said R' and said R" are selected from the group comprising polypropylene oxide, polyethyleneimine, polyphosphazine, and polysiloxane.

16. A method of forming an ion conducting polymeric laminate in accordance with claim 15 wherein said R' and said R" are both polypropylene oxide.

17. A method of forming an ion conducting polymeric laminate in accordance with claim 14 wherein the ratio of the number of moles of ethylene oxide in said block copolymer to the number of moles of lithium cations in said dissociable lithium salt is from about 6:1 to about 80:1.

18. A method of forming an ion conducting polymeric laminate in accordance with claim 17 wherein the ratio of the number of moles of ethylene oxide in said block copolymer to the number of moles of lithium cations in said dissociable lithium salt is from about 6:1 to about 20:1.

19. A method of forming an ion conducting polymeric laminate in accordance with claim 14 wherein said dissociable lithium salt is selected from the group comprising $LiPF_6$, $LiBF_4$, $LiBr$, $LiN(SO_2CF_3)_2$, $LiI$, $LiNO_3$, $LiSCN$, $LiB(C_6H_5)_4$, $LiAsF_6$, $LiCF_3COO$, $LiClO_4$, $LiCF_3SO_3$, $LiSO_3(CF_2)_3SO_3Li$, and $Li_2S$.

20. A method of forming an ion conducting polymeric laminate in accordance with claim 14 wherein said dissociable lithium salt is $LiClO_4$.

21. A method of forming an ion conducting polymeric laminate in accordance with claim 14 wherein said dissociable lithium salt is $LiCF_3SO_3$.

22. A method of forming an ion conducting polymeric laminate in accordance with claim 14 wherein said block copolymer has a molecular weight less than about 2500.

23. An ion conducting polymeric laminate comprising:
at least one substrate having at least one face; and
a layer of ion conducting polymer composition comprising an ion conducting polymer and an effective amount of a dissociable lithium salt, said polymer composition contacting said one face of said substrate, wherein said ion conducting polymer comprises a block copolymer of the formula $R'—(CH_2CH_2O)_n—R''$, the molecular weight of said block copolymer is less than about 5000, n is from about 5 to about 34, and R' and R'' are flexible units.

24. An ion conducting polymer composition comprising:
an ethylene oxide block copolymer having end groups R' and R'', said end groups being flexible units, said copolymer having a molecular weight less than about 5000; and
an effective amount of a dissociable lithium salt, wherein said composition before curing exhibits a viscosity of less than about 100 Poise and after curing, said composition exhibits a conductivity of at least about $10^{-6}$ S/cm, and a luminous transmittance of at least about 70%.

* * * * *

UNITED STATES PATENT AND TRADEMARK OFFICE
CERTIFICATE OF CORRECTION

PATENT NO. : 5,300,374
DATED : April 5, 1994
INVENTOR(S) : Anoop Agrawal, et al.

It is certified that error appears in the above-indentified patent and that said Letters Patent is hereby corrected as shown below:

Column 4, line 31
"wita" should be --with a--

Signed and Sealed this

Thirteenth Day of September, 1994

Attest:

BRUCE LEHMAN

*Attesting Officer*                *Commissioner of Patents and Trademarks*